the spring
UNITED STATES PATENT OFFICE.

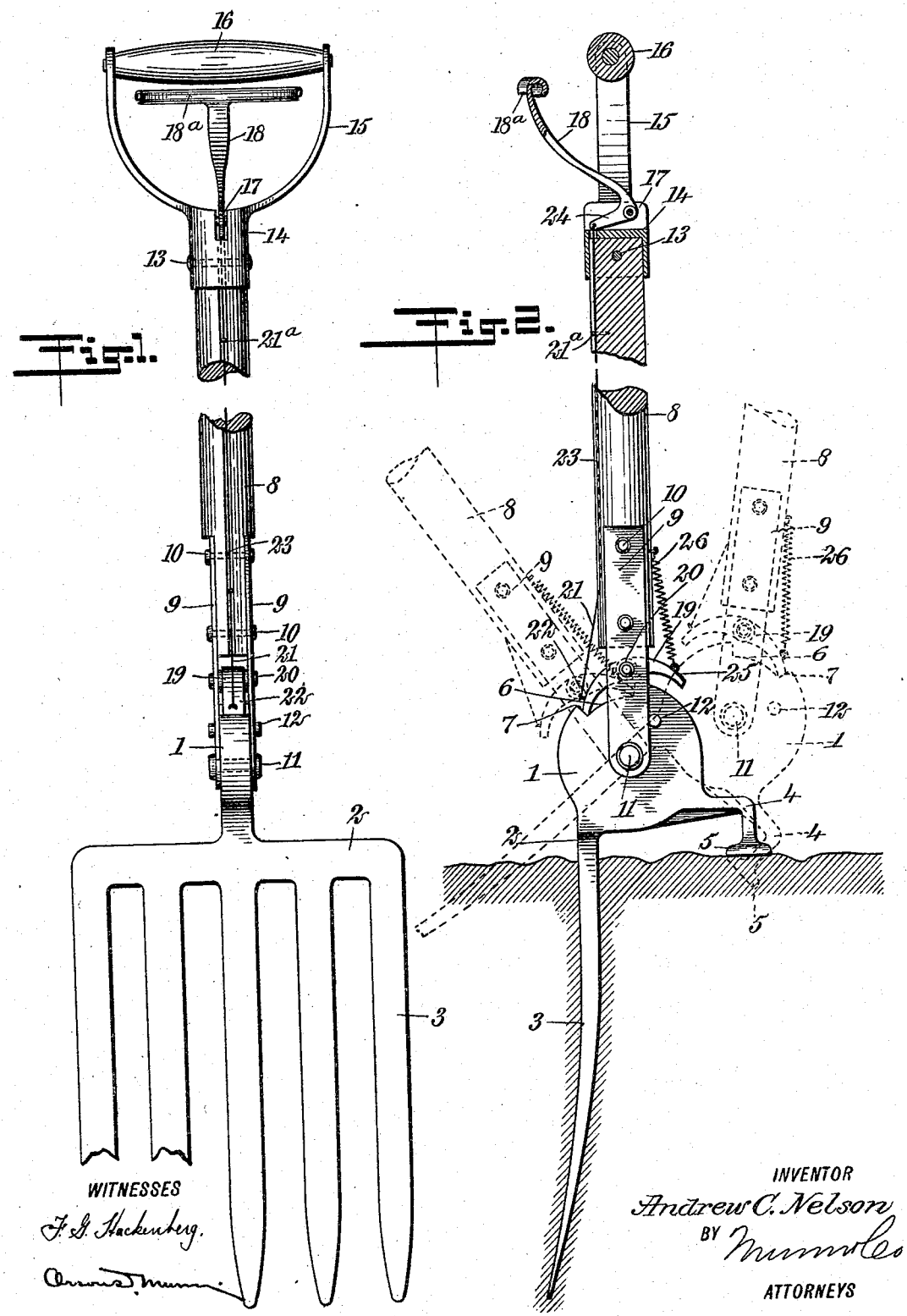

ANDREW CORNELIUS NELSON, OF NELSON TOWNSHIP, BARNES COUNTY, NORTH DAKOTA.

AGRICULTURAL IMPLEMENT.

No. 930,784.      Specification of Letters Patent.      Patented Aug. 10, 1909.

Application filed January 21, 1909. Serial No. 473,592.

*To all whom it may concern:*

Be it known that I, ANDREW C. NELSON, a citizen of the United States, and a resident of Nelson township, in the county of Barnes and State of North Dakota, have invented a new and Improved Agricultural Implement, of which the following is a full, clear, and exact description.

This invention relates to agricultural implements, and more particularly such as are known as potato forks, and each of which in general consists of a head having a fork integral therewith, the latter being provided with a plurality of tines, a shaft having a handle at its upper end pivotally secured to the head, and means for locking the shaft in a plurality of positions on the head.

The object of the invention is to provide a device of the class described, which is simple and serviceable in construction, and which, on account of the shaft being adjustably arranged on the head, obviates the necessity of the operator continually bending over while at work.

Reference is to be had to the accompanying drawings forming a part of this specification, in which similar characters of reference indicate corresponding parts in both views.

Figure 1 is a front elevation of an embodiment of my invention, having a portion broken away; and Fig. 2 is a side elevation having parts in section, and showing in dotted outline, several positions of the device during operation.

In the specific form shown in the drawings, I provide a head 1 of any suitable material, such as iron, steel or the like, which has a fork 2 preferably integral therewith, the latter being provided with a plurality of tines 3. The head further has an offset portion 4 constituting a foot, the lower extremity 5 thereof being suitably enlarged to present a greater surface for bearing on the ground. Located at the upper portion of the head is a recess 6 which forms shoulders 7, for a purpose to be hereinafter described. I further provide a shaft 8 of wood or the like, and having the opposite sides of its lower end cut-away to receive supporting members 9. The latter are secured to the shaft by means of rivets or bolts 10. The supporting members extend beyond the end of the shaft and are adapted to receive the head 1 between them. A pivot pin 11 secures these members and the shaft movably to the head. Stops 12, located on opposite sides of the head, serve to limit the movement of the supporting members in one direction. The head is partly circular in form so that the shaft can swing with respect to the head.

Arranged over the end of the shaft and secured thereto by means of a rivet 13 or the like, is a tubular crown 14 having arms 15 outwardly and upwardly disposed. A grip 16 connects these arms together. Located at the upper portion of the crown is a slot 17 in which an operating lever 18, preferably in the form of a bell crank lever, is pivotally arranged. The free end of the lever is provided with a lateral extension 18ª, the latter having its extremities outwardly curved, as shown most clearly in Fig. 1 of the drawings, to afford a better grip for the fingers in operating the lever.

Situated between the supporting members 9, below the lower extremity of the shaft, is a double-ended dog 19. A pivot pin 20 movably mounts the latter. A flexible member or line 21 is secured to the forward end 22 of the dog and passes along a groove 23 in the shaft, provided for this purpose, to the end 24 of the operating lever, to which it is secured. The end 25 of the dog is connected to the shaft by means of a resilient member 26 such as a spring or the like. Keepers 21ª movably hold the line in the groove.

In the operation of the device, the normal position is that in which the forward end 22 of the dog abuts against the shoulder 7 formed by the recess 6 in the head, and in this position, the shaft is firmly held against forward displacement by means of the engagement of the dog with the shoulder, and against rearward movement by means of the stops 12. When in the normal position, the implement is ready to be forced into the ground.

When it is desired to operatively withdraw the device, the upper portion of the operating lever 18 is drawn toward the grip 16. This causes the forward end of the dog to be drawn out of engagement with the shoulder, when the shaft may be moved forward to allow the rear end 25 of the dog to come into engagement with the rear shoulder of the recess. A pull on the shaft toward the operator will force the forks through the ground, the offset portion 5 of the head acting as a fulcrum to receive the pressure which has been exerted on the shaft. When the implement has been drawn from the ground, the spring 26 automatically draws the rear end 25 of the dog out of engagement with the shoulder, and as the portion of the head which carries the fork is heavier than the rear portion, the head will swing so that the forward end of the dog will drop into the recess and lock the parts of the device in the normal position.

Having thus described my invention, I claim as new and desire to secure by Letters Patent:

1. In a device of the class described, a head having a fork rigid therewith, the head having an offset portion adapted to rest upon the ground, a shaft movably carried by said head, and means for locking said shaft in a plurality of predetermined positions on said head.

2. In a device of the class described, a head having a shaft pivotally carried by the head and adjustable thereon, the said head having an offset portion rigid therewith, and enlarged at its lower extremity constituting a foot adapted to rest upon the ground.

3. In a device of the class described, a head having a fork rigid therewith, a shaft pivotally carried by the head, the shaft having a handle at its upper end, locking means adapted to lock said shaft in a plurality of positions on the head, an operating lever located adjacent to the handle, and a flexible member connecting said lever with the locking means.

4. In a device of the class described, a head having a fork rigid therewith, said head further having an offset portion adapted to rest upon the ground, a shaft pivotally carried by said head, and releasable means for locking said shaft on said head.

5. In a device of the class described, a head having a fork rigid therewith, and having a fulcrum part adapted to rest upon the ground, said head further having shoulders, a shaft pivotally carried by said head, and releasable means adapted to engage at each of said shoulders of said head whereby said shaft can be locked in a plurality of positions.

6. In a device of the class described, a head having a fork rigid therewith and being provided with an offset portion adapted to rest upon the ground, said head further having a recess on its upper side, a shaft, supporting members arranged one on each side of said shaft for pivotally mounting the latter on said head, and means adapted to engage at the recess of said head for locking said shaft in a plurality of predetermined positions.

7. In a device of the class described, a head having a fork rigid therewith, and being provided with an offset portion adapted to rest upon the ground, the latter serving as a fulcrum, said head further having a recess on its upper side, a shaft, supporting members arranged one on each side of said shaft and serving movably to mount the latter on said head, and a dog carried by said members and adapted to engage said recess to lock said shaft in a plurality of predetermined positions.

8. In a device of the class described, a head having a fork rigid therewith, and being provided with an offset portion adapted to rest upon the ground, said offset portion serving as a fulcrum, said head further having a recess on its upper side, a shaft, supporting members arranged one on each side of said shaft and serving movably to mount the latter on said head, a dog carried by said members and adapted to engage said recess to lock said shaft in a plurality of predetermined positions, manually operable means for releasing said dog, and means for holding said dog in a normal position.

9. In a device of the class described, a head having a fork integral therewith and being provided with an offset portion adapted to rest upon the ground, said offset portion serving as a fulcrum in the operation of the device, said head having a recess on its upper side, a shaft, supporting members pivotally mounting said shaft on said head, a double-ended dog carried by said members, a lever located on said shaft, a flexible member connecting one end of said dog to said lever, whereby said dog can be controlled from a remote point, and a resilient member connecting the other end of said dog to said shaft for normally holding said last-mentioned end out of engagement with said head.

10. In a device of the class described, a head having a fork rigid therewith, the head having a recess on its upper side, a shaft, supporting members for movably mounting said shaft on said head and a dog carried by said supporting members, and adapted to engage said recess to lock said shaft in a plurality of predetermined positions.

11. In a device of the class described, a head having a fork rigid therewith, the head having a recess on its upper side forming shoulders at its ends, a shaft, supporting members secured to the shaft and pivotally mounting the shaft on the head, stops on the head for limiting the movement of the supporting members and shaft in one direction, a double ended dog located between the supporting members and pivoted thereto, and adapted to engage the shoulders formed by said recess to lock the shaft in a plurality of predetermined positions, manually operable means for releasing said dog, and means for holding said dog in a normal position.

12. In a device of the class described, a head provided with a fork, a shaft pivotally connected with the head and having a handle at its free end, the said head having shoulders formed thereon, locking means adapted to engage said shoulders to lock the shaft in a plurality of positions on the head, and means located adjacent to the handle and connected with said locking means for controlling the latter.

13. In a device of the class described, a head provided with a fork, a shaft pivotally connected with the head, a double ended dog carried by the shaft and adapted to engage the head to lock the shaft in a plurality of positions, manually operable means connected with one end of the dog for controlling the same, and a spring connecting the other end of said dog to said shaft for normally holding said last mentioned end out of engagement with said head.

In testimony whereof I have signed my name to this specification in the presence of two subscribing witnesses.

ANDREW CORNELIUS NELSON.

Witnesses:
W. W. SMITH,
MARK A. SMITH.